United States Patent [19]

Mizoguchi

[11] Patent Number: 5,068,667
[45] Date of Patent: Nov. 26, 1991

[54] CROSS-POLARIZATION INTERFERENCE CANCELLER

[75] Inventor: Shoichi Mizoguchi, Tokyo, Japan

[73] Assignee: NEC Corporation, Japan

[21] Appl. No.: 644,963

[22] Filed: Jan. 22, 1991

[30] Foreign Application Priority Data

Jan. 23, 1990 [JP] Japan .................................. 2-11826

[51] Int. Cl.$^5$ ...................... H01Q 21/06; H01Q 21/24; H04B 7/10
[52] U.S. Cl. .................................. 342/362; 455/295; 455/296
[58] Field of Search ................ 342/361, 362; 455/295, 455/296

[56] References Cited

U.S. PATENT DOCUMENTS 4,910,468  3/1990  Ohtsuka et al. ...................... 455/295
4,992,798  2/1991  Nozue et al. ......................... 342/362

OTHER PUBLICATIONS

Proakis, Digital Communications, McGraw-Hill, 1983, pp. 364–371.
Lankl et al., IEEE International Conference on Communications '88, vol. 3, pp. 1355–1361.
Cross–Polarization Interference Cancellation in the Presence of Delay Effects.

Primary Examiner—Theodore M. Blum
Attorney, Agent, or Firm—Laff, Whitesel, Conte & Saret

[57] ABSTRACT

In a cross-polarization interference conceller for use in a digital radio communication system which transmits digital modulated signals over radio frequencies having planes of polarization orthogonal to each other, signals from the interfering polarized wave are sampled with a frequency equal to double the frequency of the affected polarized wave and, after latching the sampled signals with the frequency of the symbol rate, interference cancelling signals are generated by adding the products of their multiplication with control signals. Therefore, the digital multipliers and the digital adders for generating the interference cancelling signals can be operated at low speed.

5 Claims, 9 Drawing Sheets

CROSS-POLARIZATION INTERFERENCE CANCELLER

BACKGROUND OF THE INVENTION

This invention relates to a cross-polarization interference canceller for use in a digital radio communication system which transmits digital modulated signals over ratio frequencies having planes of polarization orthogonal to each other.

Digital radio communication systems transmit digital modulated signals, such as multi-level quadrature amplitude-modulated signals or multi-phase phase-modulated signals, over a mutually orthogonal pair of a vertical polarized wave and a horizontal polarized wave. In such systems, as long as the orthogonality between the vertical polarized wave and the horizontal polarized wave is maintained, signals transmitted over either one of the orthogonally crossing polarized waves do not interfere with the other. They may interfere with the other, however, if this orthogonality is disturbed by the effect of fading, rain or the like on the transmission path. This interference is known as cross-polarization interference. For the elimination of this cross-polarization interference is used a cross-polarization interference canceller.

For this kind of cross-polarization interference canceller, reference may be made to a paper entitled "CROSS-POLARIZATION INTERFERENCE CANCELLATION IN THE PRESENCE OF DELLY EFFECTS" by B. Lankl, J. A. Nossek and G. Sebald, in Conference Record of IEEE International Conference on Communications '88 held in Philadelphia, on June 12-15, 1988, Volume 3 of 3, pages 1355-1361. Toru Matsuura on July 27, 1990 applied for a U.S. patent on "Cross-Polarization Interference Cancellation System Capable of Stably Carrying Out Operation" under application Ser. No. 07/558,754, and on the same day also filed an application with E.P.C. for a patent on "Cross-Polarization Interference Cancellation System Capable of Stably Carrying Out Operation" under Application No. 900114460.0.

The transversal filter-based cross-polarization interference canceller in these systems, however, carries out high speed operation at double the frequency of the symbol rate so that it may not lose its cross-polarization interference cancelling capability even if a lag occurs between the transmission delay time of the main signals on one polarized wave and interfering signals on the other. Therefore, if this cross-polarization interference canceller is composed as a fully digital processing type, the digital multiplier and the digital adder in the circuit will have to be operated at high speed. Such a digital multiplier usually is expensive and consumes much power.

Meanwhile, even if the cross-polarization interference canceller is large-scale integrated (LSI) by using complementary metal oxide semiconductors (CMOS's), they have to be able to operate at a high frequency, and such CMOS's also consume much power.

Conceivably, the processing speed can be increased by connecting more than one low-speed cross-polarization interference canceller in parallel, but this arrangement would require a plurality of cross-polarization interference cancellers and a circuit for controlling their parallel operation, which again means the disadvantages of complexity, a high cost and high power consumption.

SUMMARY OF THE INVENTION

It is therefore an object of this invention to provide a low-speed and low-cost cross-polarization interference canceller.

Another object of the invention is to provide a cross-polarization interference canceller operable without consuming much power.

Still another object of the invention is to provide a cross-polarization interference canceller permitting simplification.

According to the invention, there is provided a cross-polarization interference canceller for use in a digital radio communication system which transmits digital modulated signals over radio frequencies having planes of polarization orthogonal to each other and into which analog baseband signals resulting from the detection of digital modulated signals of a first polarized wave and demodulated signals discriminatively regenerated by detecting digital modulated signals of a second polarized wave are entered to supply demodulated signals of the second polarized wave cleared of the component of interference by the first polarized wave with the second polarized wave. The canceller comprises: analog-to-digital (A/D) converting means for sampling said analog baseband signals with a first sampling frequency equal to double the frequency of the modulation rate of the second polarized wave and supplying digital data signals; an N-tap shift register for delaying said digital data signals, each by a period corresponding to the reciprocal of said first sampling frequency, and supplying first through Nth (N≧2) delayed digital data signals; latching means for latching said digital data signals and said first through Nth delayed digital data signals, each by a period corresponding to the reciprocal of the modulation rate of said second polarized wave, and supplying first through (N+1)th latched digital data signals; tap coefficient generating means responsive to said digital data signals of said first polarized wave and said demodulated signals of said second polarized wave cleared of the component of interference by the first polarized wave, for generating first through (N+1)th control signals; first through (N+1)th multiplying means, supplied with a second sampling frequency equal to the frequency of the modulation rate of said second polarized wave, for multiplying the matching pairs of said first through (N+1)th latched digital data signals and said first through (N+1)th control signals and supplying first through (N+1)th multiplication product signals; first adding means, supplied with said second sampling frequency, for adding said first through (N+1)th multiplication product signals and supplying an interference cancelling signal; delaying means for delaying said demodulated signals by a predetermined lag and supplying delayed demodulated signals; and second adding means, supplied with said second sampling frequency, for adding said delayed demodulated signals and said interference cancelling signal, and supplying demodulated signals cleared of said component of interference.

DETAILED DESCRIPTION OF THE PREFERRED EMBODIMENTS

In order to facilitate the understanding of this invention, a typical cross-polarization interference cancellation system and a prior art cross-polarization interference canceller for use in this system will first be described with reference to drawings.

Figure 1:
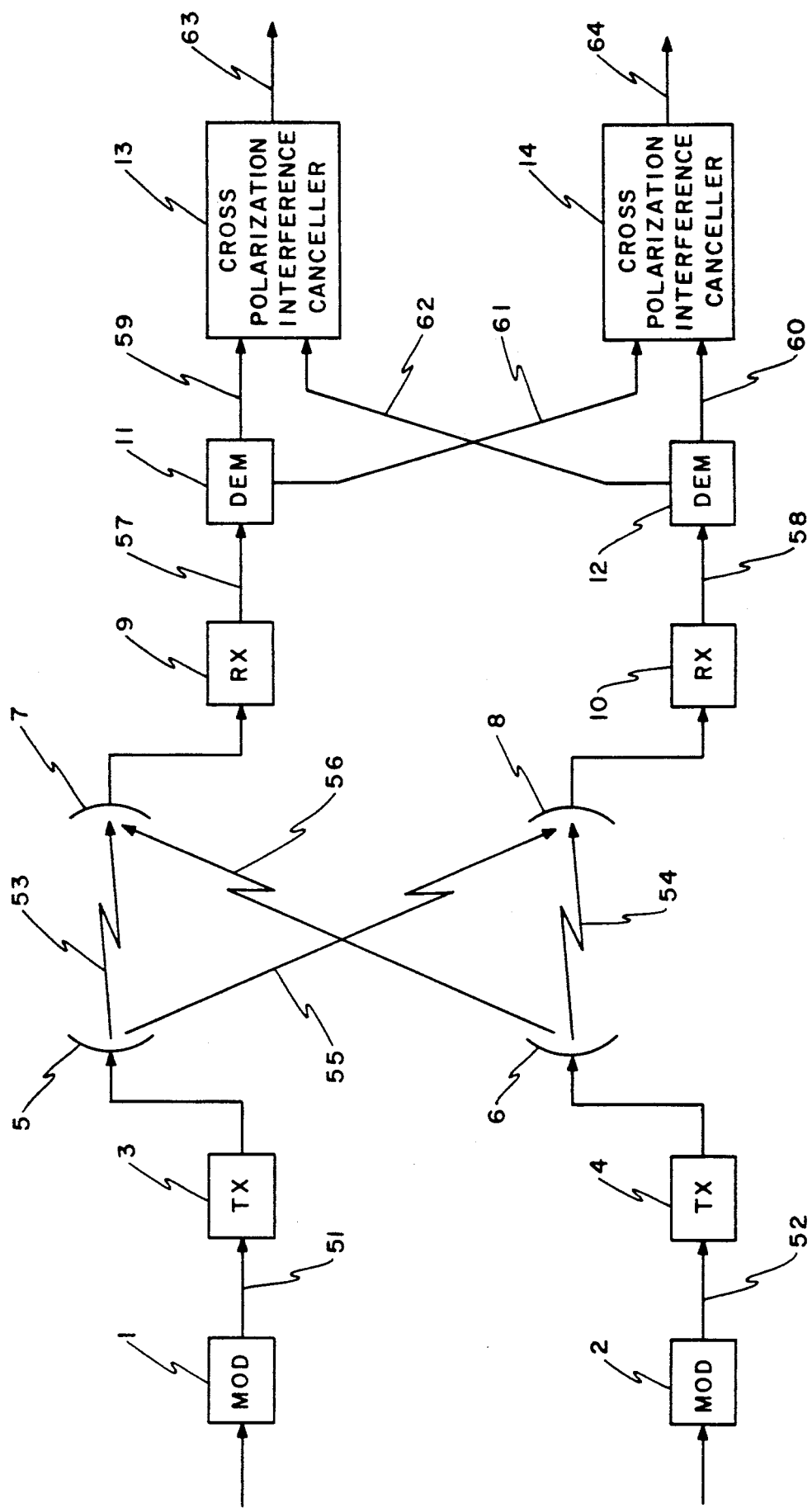
FIG. 1 is a structural block diagram illustrating a typical cross-polarization interference cancellation system to which a both prior art and present, cross-polarization interference cancellers are applicable.

FIG. 1 is a structural block diagram illustrating the general cross-polarization interference cancellation system.

Transmitters (TX) 3 and 4 respectively convert the frequencies of a digital modulated signal 51 from a modulator (MOD) 1 and a digital modulated signal 52 from a modulator (MOD) 2, and supply transmit signals of radio frequencies. Transmitting antennas 5 and 6 send out the transmit signals of radio frequencies from the transmitters 3 and 4, respectively, on a vertical polarized wave and a horizontal polarized wave orthogonal to each other. A receiving antenna 7 receives a transmit signal 53 over a vertical polarized wave and an interference signal 56 from a horizontal polarized wave to the vertical polarized wave, and supplies a receive signal. Similarly, a receiving antenna 8 receives a transmit signal 54 over a horizontal vertical polarized wave and an interference signal 55 from the vertical polarized wave to the horizontal polarized wave, and supplies another receive signal. Receivers (RX) 9 and 10 respectively convert the frequencies of the receive signals, and supply digital modulated signals 57 and 58 of the intermediate frequency (IF) band. Demodulators (DEM) 11 and 12 supply analog baseband signals 61 and 62 following the detection of the digital modulated signals 57 and 58 of the IF band, and demodulated signals (digital baseband signals) 59 and 60 following the discriminative regeneration of the analog baseband signals 61 and 62. A cross-polarization interference canceller (XPIC) 13 generates an interference cancelling signal according to the analog baseband signal 62, and supplies a demodulated signal 63 resulting from the removal of the interference content from the horizontal polarized wave according to this interference cancelling signal and the demodulated signal 59. Another cross-polarization interference canceller (XPIC) 14 generates another interference cancelling signal according to the analog baseband signal 61, and supplies a demodulated signal 64 resulting from the removal of the interference content from the vertical polarized wave according to this interference cancelling signal and the demodulated signal 60.

Figure 2:
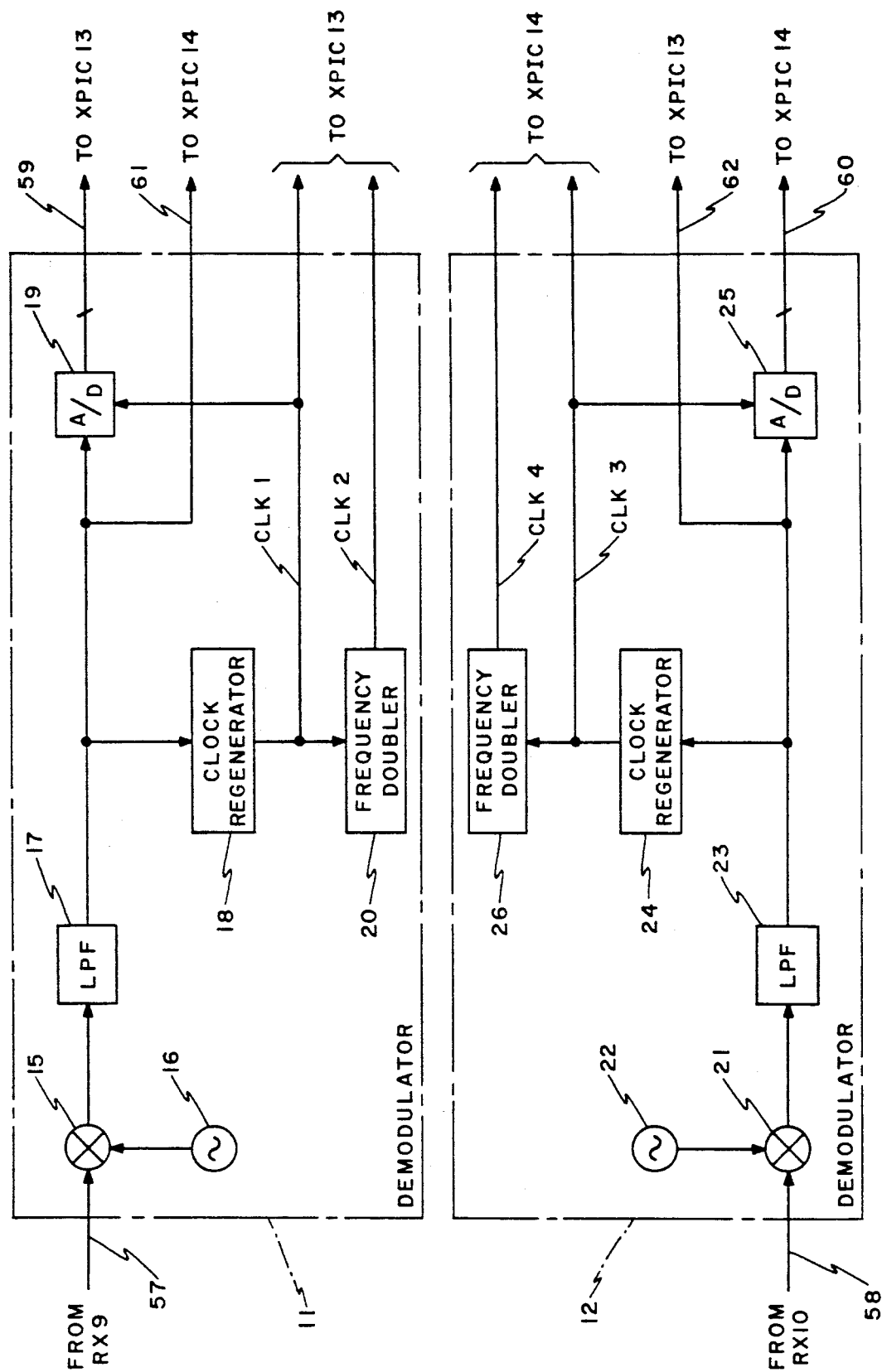
FIG. 2 is a structural block diagram illustrating the demodulator in FIG. 1 in further detail.

FIG. 2 is a structural block diagram illustrating the interior of the demodulator in FIG. 1. A detector 15 detects with a regenerated carrier from a carrier regenerating circuit 16 the digital modulated signal 57, resulting from the frequency-conversion of the receive signal received by the receiving antenna on the vertical polarized wave side, and supplies a detection signal. A low-pass filter (LPF) 17 clears the detection signal of its unnecessary high frequency components, and supplies the analog baseband signal 61. A clock regenerator 18 generates and supplies a clock $CLK_1$ having a frequency of $f_{s1}$, which is equal to a symbol rate, and a period of $T_1 (=1/f_{s1})$ in response to the analog baseband signal 61. An analog-to-digital (A/D) converter 19 samples the analog baseband signal 61 with the clock $CLK_1$ and supplies the demodulated signal 59 (digital baseband signal). A frequency doubler 20 doubles the frequency of the clock $CLK_1$ and supplies a clock $CLK_2$ having a period of $T_1/2$.

Similarly another detector 21 detects with a regenerated carrier from another carrier regenerating circuit 22 the digital modulated signal 58, resulting from the frequency-conversion of the receive signal received by the receiving antenna on the horizontal polarized wave side, and supplies another detection signal. Another low-pass filter (LPF) 23, into which the detection signal is entered, supplies the analog baseband signal 62. Another clock regenerator 24 generates and supplies a clock $CLK_3$ having a frequency of $f_{s2}$, which is equal to another symbol rate, and a period of $T_2 (=1/f_{s2})$ from the analog baseband signal 62. The frequency of the clock $CLK_3$ may be the same as that of the clock $CLK_1$. Another analog-to-digital (A/D) converter 25 samples the analog baseband signal 62 with the clock $CLK_3$ and supplies the demodulated signal 60 (digital baseband signal). Another frequency doubler 26 doubles the frequency of the clock $CLK_3$ and supplies a clock $CLK_4$.

Figure 3:
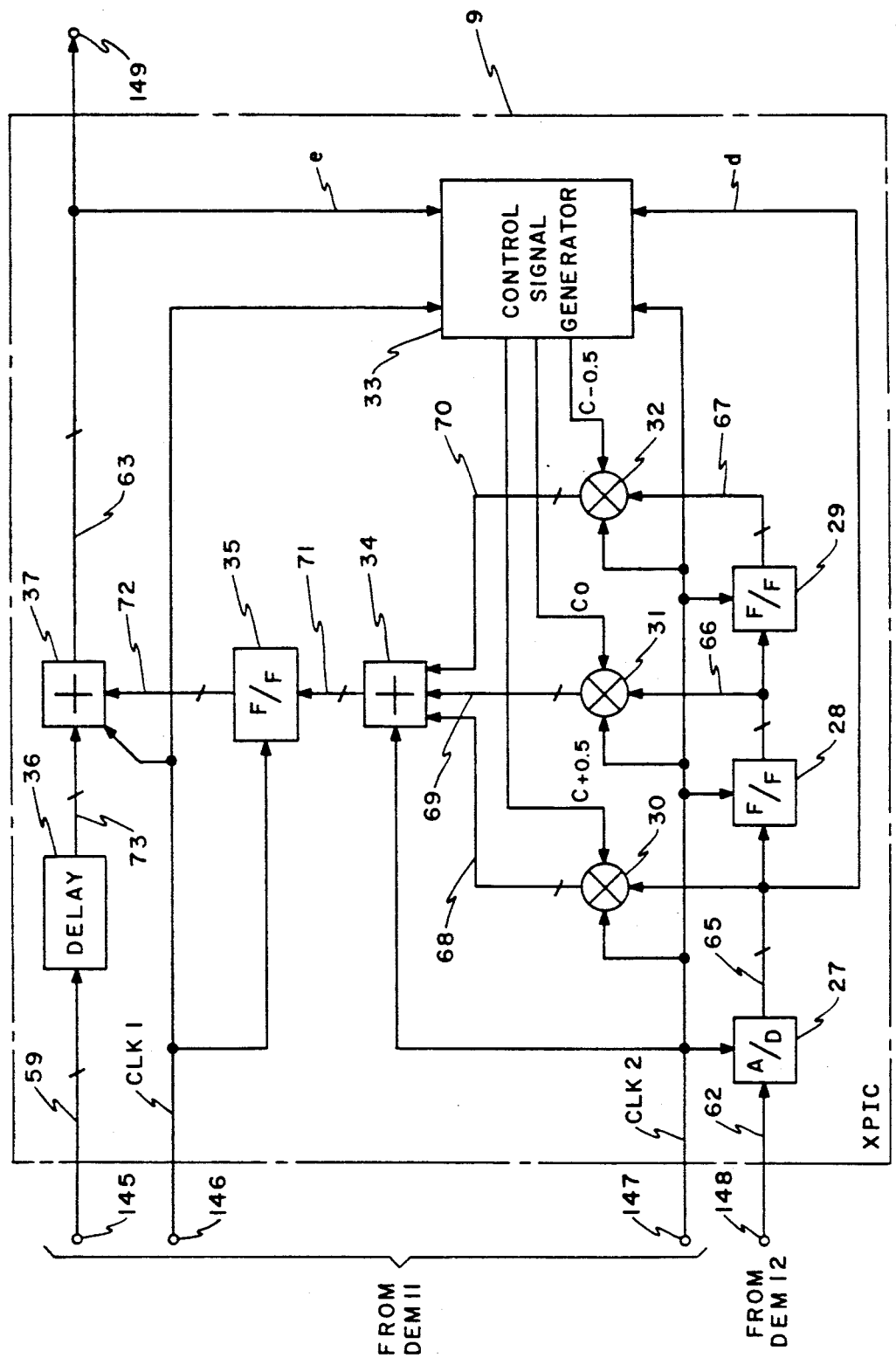
FIG. 3 is a structural block diagram illustrating a cross-polarization interference canceller according to the prior art.
Figure 4:
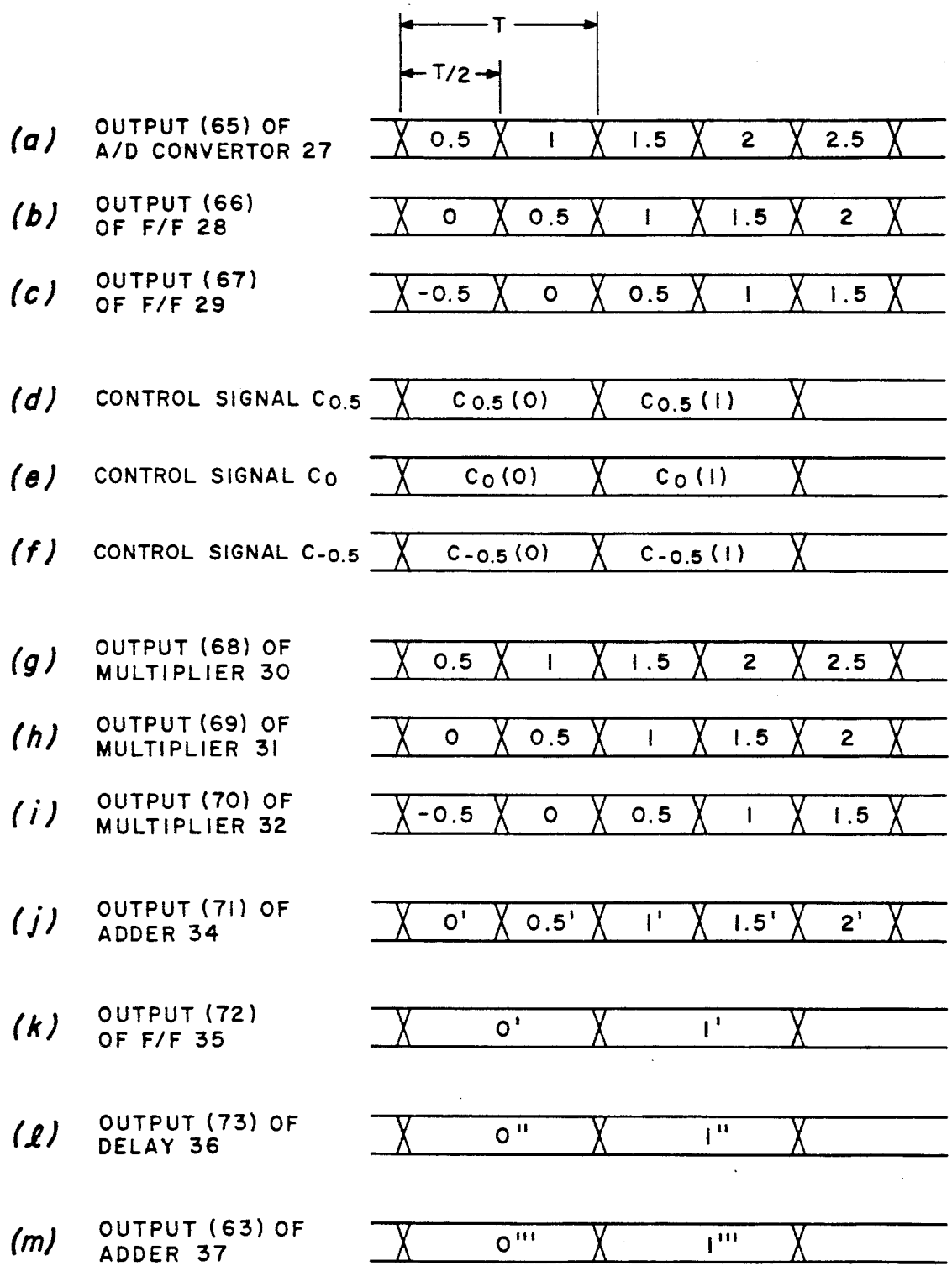
FIG. 4 is a timing chart for describing the timings of input and output signals in different parts of FIG. 3.

FIG. 3 is a structural block diagram illustrating the interior of a cross-polarization interference canceller according to the prior art, though showing only the cross-polarization interference canceller 13 on the vertical polarized wave side. FIG. 4 is a timing chart for describing the timings of input and output signals in different parts of FIG. 3. Described below is the operation of the prior art cross-polarization interference canceller with reference to the timing chart.

To input terminals 145, 146 and 147 are respectively supplied the demodulated signal 59, resulting from the demodulation of a digital modulated signal with the demodulator 11 on the vertical polarized wave side, the clock $CLK_1$ of $f_{s1}$ in frequency, regenerated from the digital modulated signal, and the clock $CLK_2$ of $2f_{s1}$ in frequency, and to another input terminal 148 is supplied the analog baseband signal 62, resulting from the detection of another digital modulated signal by the demodulator 12 on the horizontal polarized wave side. An A/D converter 27 samples the analog baseband signal 62 with a clock $CLK_2$ having a period of $T_1/2$ and supplies a digital data signal 65 (FIG. 4(a)). A flip-flop (F/F) 28 delays the digital data signal 65 by $T_1/2$ with the clock $CLK_2$ and supplies an output signal 66 (FIG. 4(b)). An F/F 29 delays the output signal 66 of the F/F 28 by $T_1/2$ with the clock $CLK_2$ and supplies another output signal 67 (FIG. 4(c)). Digital multipliers 30, 31 and 32 respectively multiply the signals 65, 66 and 67 by control signals $C_{+0.5}$, $C_0$ and $C_{-0.5}$ from a control signal generator 33, and supply multiplication output signals 68, 69 and 70 at the timing of the clock $CLK_2$ (FIGS. 4(g) to (i)). A digital adder 34 adds the multiplication outputs 68, 69 and 70 and supplies an addition output signal 71 at the timing of the clock $CLK_2$. Since this addition output signal 71, as shown in FIG. 4(j), is supplied in a period of $T_1/2$, there are present two data in a period of T. As one of the data is unnecessary for cancelling the main signal data, the period of the addition output signal should be altered to T. A latching circuit 35, consisting of an F/F for example, latches the addition output signal 71 at every other bit and supplies an interference cancelling signal 72 at the timing of the clock $CLK_1$ having a period of T (FIG. 4(k)).

A delay circuit 36, consisting of a shift register (SR), is provided to compensate for the delay time lag between the demodulated signal 59 and the interference cancelling signal 72. The demodulated signal 59 is entered into it, which supplies a delayed demodulated signal 73 (FIG. 4(l)). A digital adder 37 adds the delayed demodulated signal 73 and the interference cancelling signal 72, and supplies an output terminal 149, at the timing of the clock signal $CLK_1$, with a demodulated signal 63 cleared of the interference component.

As a method for the control signal generator 33 to generate control signals $C_{+0.5}$, $C_0$ and $C_{-0.5}$, the mean square error (MSE) method, for instance, is known to those skilled in the art. This MSE method, which is similar to the algorithm used in a transversal filter-based automatic equalizer, is described on, for instance, pages 364-371 of a book entitled "DIGITAL COMMUNICATIONS" by John G. Proakis, and published by McGraw-Hill Book Company in 1983. To explain it briefly, by the MES method, the correlations of an error signal E representing the difference between the demodulated signal of one polarized wave, cleared of the interference component, and a transmitted signal value on one hand and the demodulated signal of the other polarized wave for generating an interference cancelling signal on the other are determined, and these correlations are averaged, thereby to consecutively update a control signal so as to minimize the mean squared error.

A simpler method than the MSE method is the modified zero forcing (MZF) method which uses the correlations between the polarity e of the error signal E of the demodulated signal of one polarized wave and the polarity d of the demodulated signal D of the other polarized wave.

For use as the cross-polarization interference canceller 14 on the horizontal polarized wave side, the modulated signal 60 resulting from the demodulation of a digital modulated signal by the demodulator 12 on the horizontal polarized wave side, the clocks $CLK_3$ and $CLK_4$ regenerated from the digital modulated signal, and the analog baseband signal 61 resulting from the detection of another digital modulated signal by the demodulator 11 on the vertical polarized wave side can be respectively entered into the input terminals 145, 146, 147 and 148, with the configuration of the circuit remaining the same.

A cross-polarization interference canceller of this configuration requires expensive units, operating at the high speed of $2f_s$ in frequency, for the digital multipliers 30, 31 and 32 and the digital adder 34. The canceller, if large-scale integrated by using CMOS's for these circuits, will consume much power.

Figure 5:
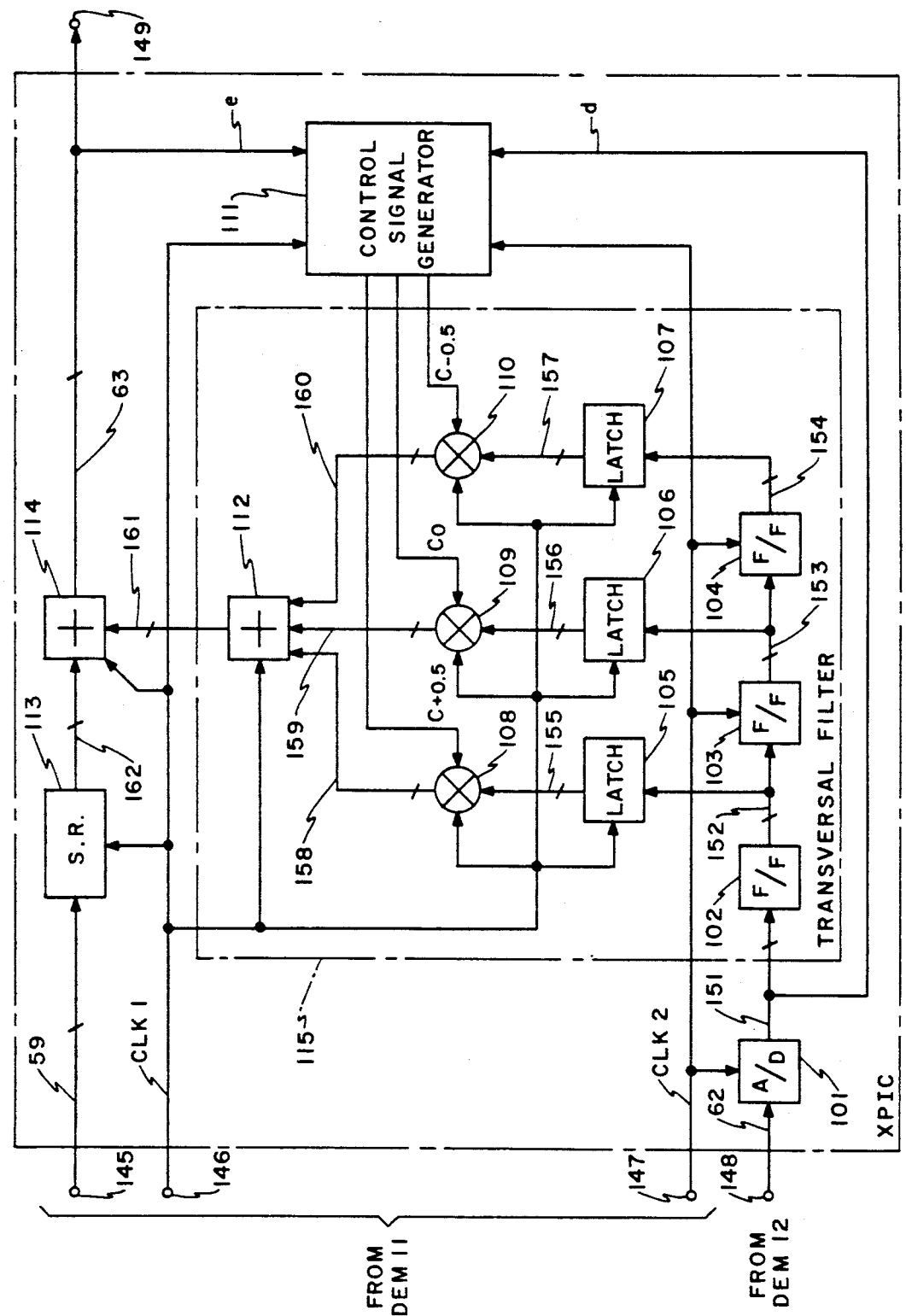
FIG. 5 is a structural block diagram illustrating a cross-polarization interference canceller which is a first preferred embodiment of this invention.
Figure 6:
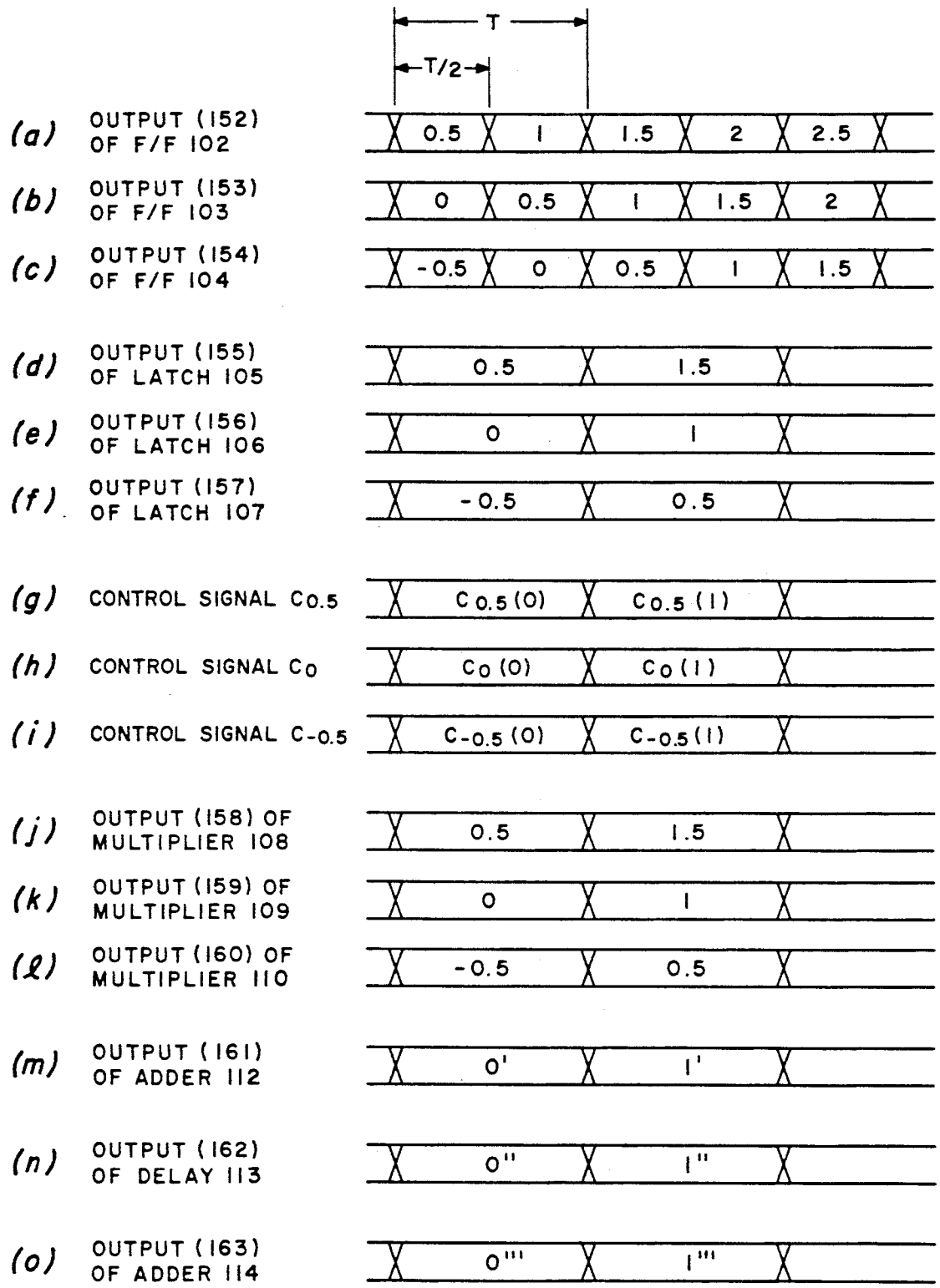
FIG. 6 is a timing chart for describing the timings of input and output signals in different parts of FIG. 5.

FIG. 5 is a structural block diagram illustrating a cross-polarization interference canceller according to this invention, and FIG. 6 is a timing chart of the timings of input and output signals in different parts of FIG. 5.

To input terminals 145, 146, 147 and 148 are respectively supplied a demodulated signal 59, resulting from the demodulation of a receive signal received on the vertical polarized wave side, a clock $CLK_1$ of $f_{s1}$ in frequency, equal to a symbol rate, a clock $CLK_2$ of $2f_{s1}$ in frequency and an analog baseband signal 62, resulting from the detection of another receive signal received on the horizontal polarized wave side. An A/D converter 101 samples the analog baseband signal 62 with the clock $CLK_2$ to supply a digital data signal 151. A buffer circuit 102, into which the digital data signal 151 is entered, supplies a retimed digital data signal 152 (FIG. 6(a)). The buffer circuit 102 is composed of an F/F or a line driver. This buffer circuit 102 is provided to reduce the number of circuits directly connected to the A/D converter and thereby to prevent the output waveform of the A/D converter 101 from deterioration because, where the output of the A/D converter 101 is connected to many circuits, its waveform will deteriorate if the fan-out of the A/D converter 101 is small. Where the number of circuits directly connected to the A/D converter 101 is small, this buffer circuit 102 can be dispensed with.

F/F's 103 and 104 respectively delay the digital data signals 152 and the output signal 153 of the F/F 103 by $T_1/2$ with the clock $CLK_2$ and supply output signals 153 and 154 (FIGS. 6(b) and (c)). Latching circuits 105, 106 and 107 respectively latch the signals 152, 153 and 154 with the clock $CLK_1$ of $f_{s1}$ in frequency, and supply latched signals 155, 156 and 157 (FIGS. 6(d), (e) and (f)). Digital multipliers 108, 109 and 110 respectively multiply the latched signals 155, 156 and 157 by control signals $C_{+0.5}$, $C_0$ and $C_{-0.5}$ (FIGS. 6(g), (h) and (i)), generated by a control signal generator 111 by the MZF method, at the timing of the clock $CLK_1$, and supply multiplication output signals 158, 159 and 160 (FIGS. 6(j), (k) and (l)). A digital adder 112 adds the multiplication outputs 158, 159 and 160 at the timing of the clock $CLK_1$, and supplies an interference cancelling signal 161 (FIG. 6(m)).

An SR 113 is intended to compensate for the delay time lag L attributable to the F/F's 102 and 103, the latching circuit 106, the digital multiplier 109 and the digital adder 112 which constitute the main tap signal path to generate the interference cancelling signal 161. It delays the demodulated signal 59 by L, and supplies a delayed demodulated signal 162 (FIG. 6(n)). Another digital adder 114 adds the delayed demodulated signal 162 and the interference cancelling signal 161 at the timing of the clock $CLK_1$, and supplies an output terminal 149 with a demodulated signal 63 cleared of the interference components (FIG. 6(o)).

In the absence of the buffer circuit 102, the delay time of the SR 113 is less by that of the buffer circuit 102.

As comparison of FIGS. 6(j) through (m) with FIGS. 4(g) through (j) would readily reveal, according to this invention, digital multipliers and digital adders operate in periods of T, and accordingly low-speed less power consuming elements can be used herein for digital multipliers and digital adders.

Figure 7:
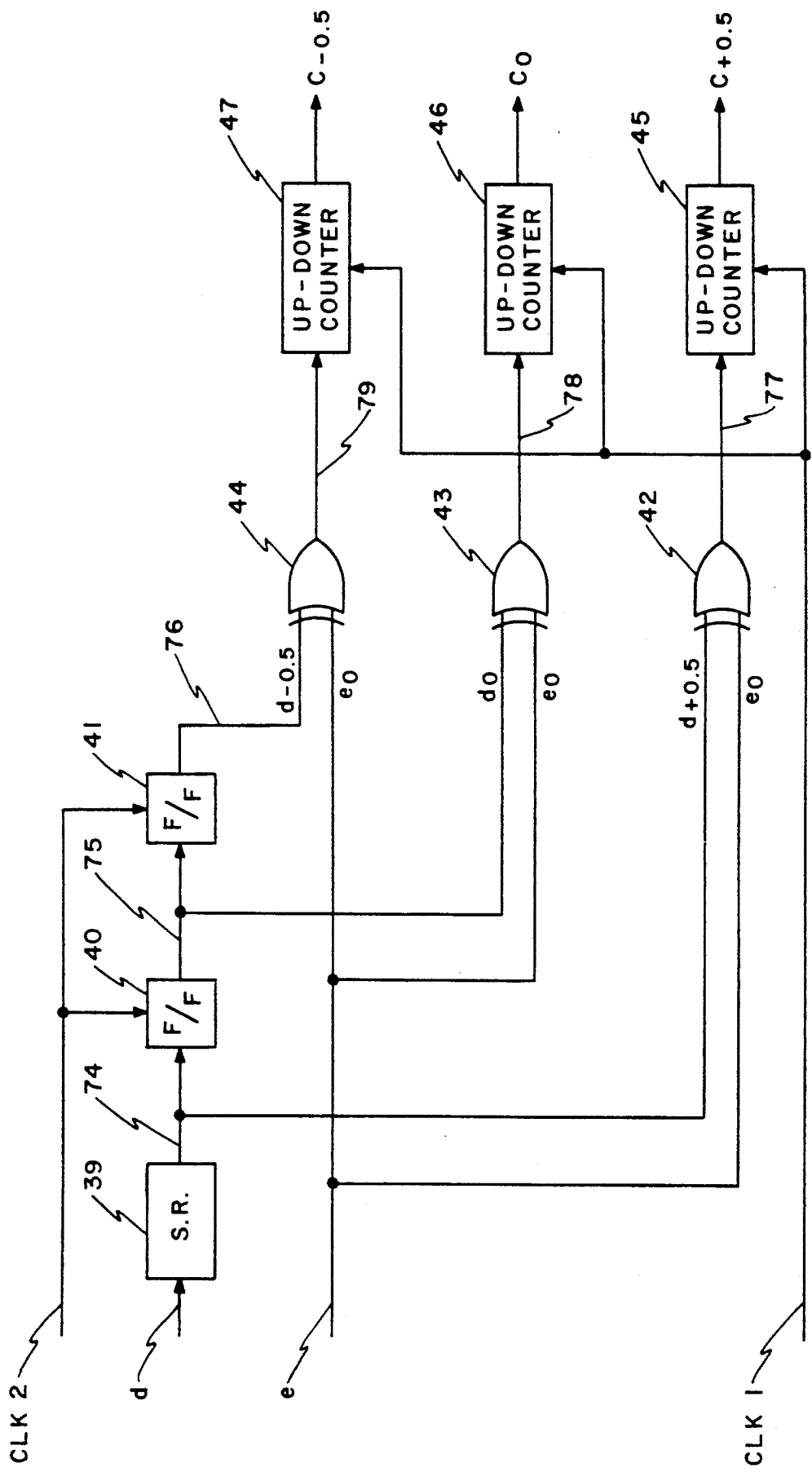
FIG. 7 is a structural diagram of the control signal generator in FIG. 5.

FIG. 7 is a structural diagram illustrating the internal configuration of the control signal generator 111 for generating control signals by the aforementioned MZF method.

An S.R 39 is provided to compensate for the lag in delay time between a polarity signal d, which is the most significant bit (MSB) of the digital data signal 151 on the horizontal polarized wave side, and an error polarity signal e, which is the MSB of the error signal in the demodulated signal on the vertical polarized side cleared of the interference component. The S.R 39 delays the polarity signal d, and supplies a delayed signal 74. F/F's 40 and 41, into which the delay signal 74 from the S.R 39 is entered, supplies output signals 75 and 76 at the timing of the clock $CLK_2$ having a period of $T_1/2$. The delay signal 74 and the output signals 75 and 76, all deriving from the delaying of the polarity signal d, can be represented by $d_{+0.5}$, $d_0$ and $d_{-0.5}$. The signal $d_{-0.5}$ is behind the signal $d_0$ by $T_1/2$ second, while the signal $d_{+0.5}$ is ahead of the signal $d_0$ by $T_1/2$ second. The polarity signal e of the error signal, as it indicates the same time as the signal $d_0$ which is the output signal 75 of the F/F 40, can be represented by $e_0$. An exclusive OR circuit 42 determines the correlation between the polarity signal $e_0$ of the error signal and the polarity signal $d_{+0.5}$ of the digital data signal, which is $T_1/2$ second ahead, and supplies a correlation signal 77. Another exclusive OR circuit 43 determines the correlation between the signals $e_0$ and $d_0$, and supplies a correlation signal 78. Still another exclusive OR circuit 44 determines the correlation between the polarity signal $e_0$ and the polarity signal $d_{-0.5}$ of the digital data signal, which is $T_1/2$ second behind, and supplies a correlation signal 79. Up-down counters 45, 46 and 47 count down or up at every T period of the clock $CLK_1$ according to the "0" or "1" values of the correlation signals 77, 78 and 79, respectively, and supplies the control signals $C_{+0.5}$, $C_0$ and $C_{-0.5}$, which are the integrated values of the respective correlation signals.

Referring back to FIG. 5, for use as the cross-polarization interference canceller 14 on the vertical polarized wave side, the modulated signal 60 resulting from the demodulation of a receive signal on the horizontal polarized wave side, the clocks $CLK_3$ and $CLK_4$, and the analog baseband signal 61 resulting from the detection of another receive signal on the vertical polarized wave side can be respectively entered into the input terminals 145, 146, 147 and 148.

Figure 8:
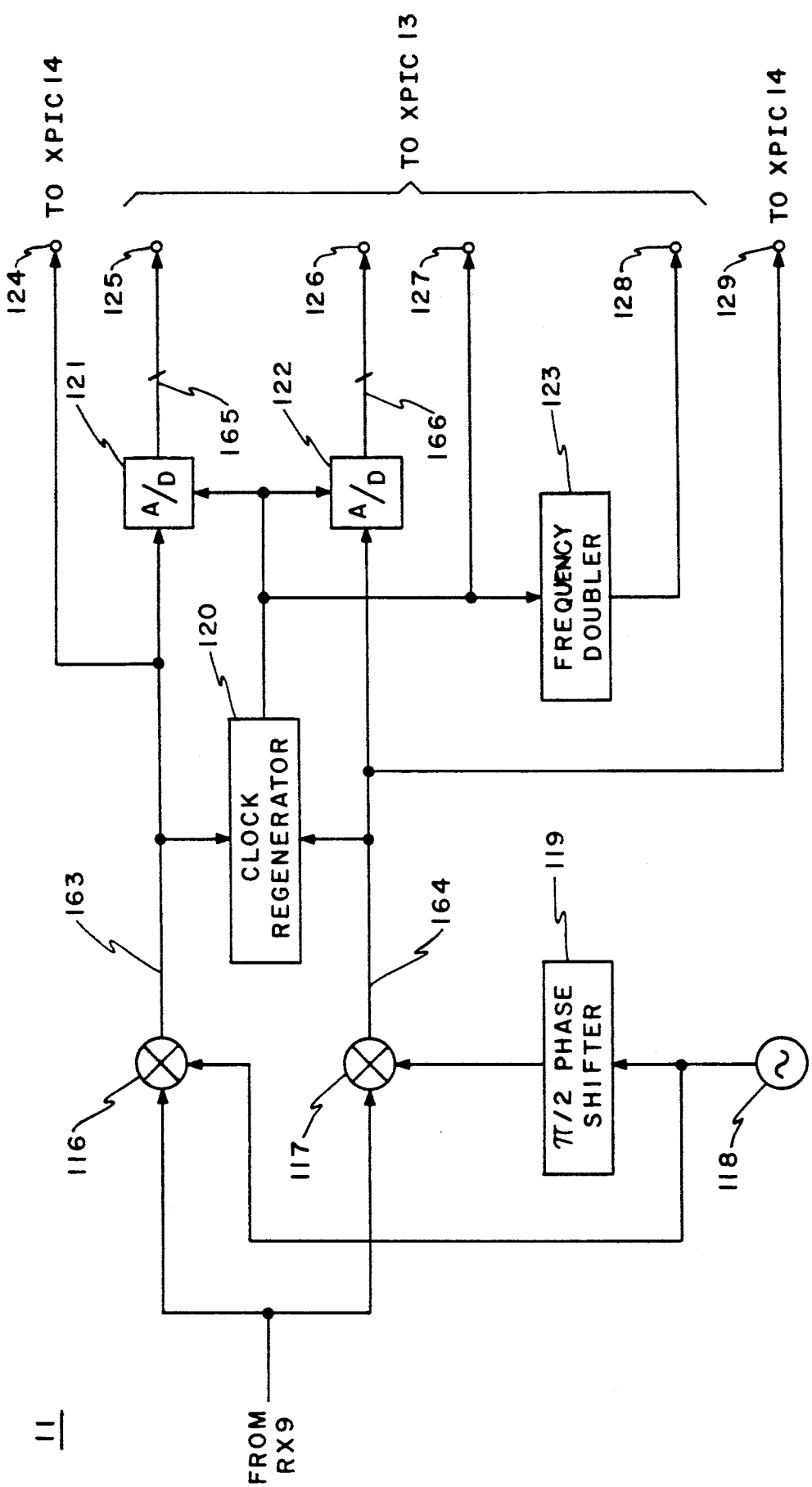
FIG. 8 is a structural block diagram of a demodulator using a multi-level orthogonal amplitude modulating system or a multi-phase phase modulation system.
Figure 9:
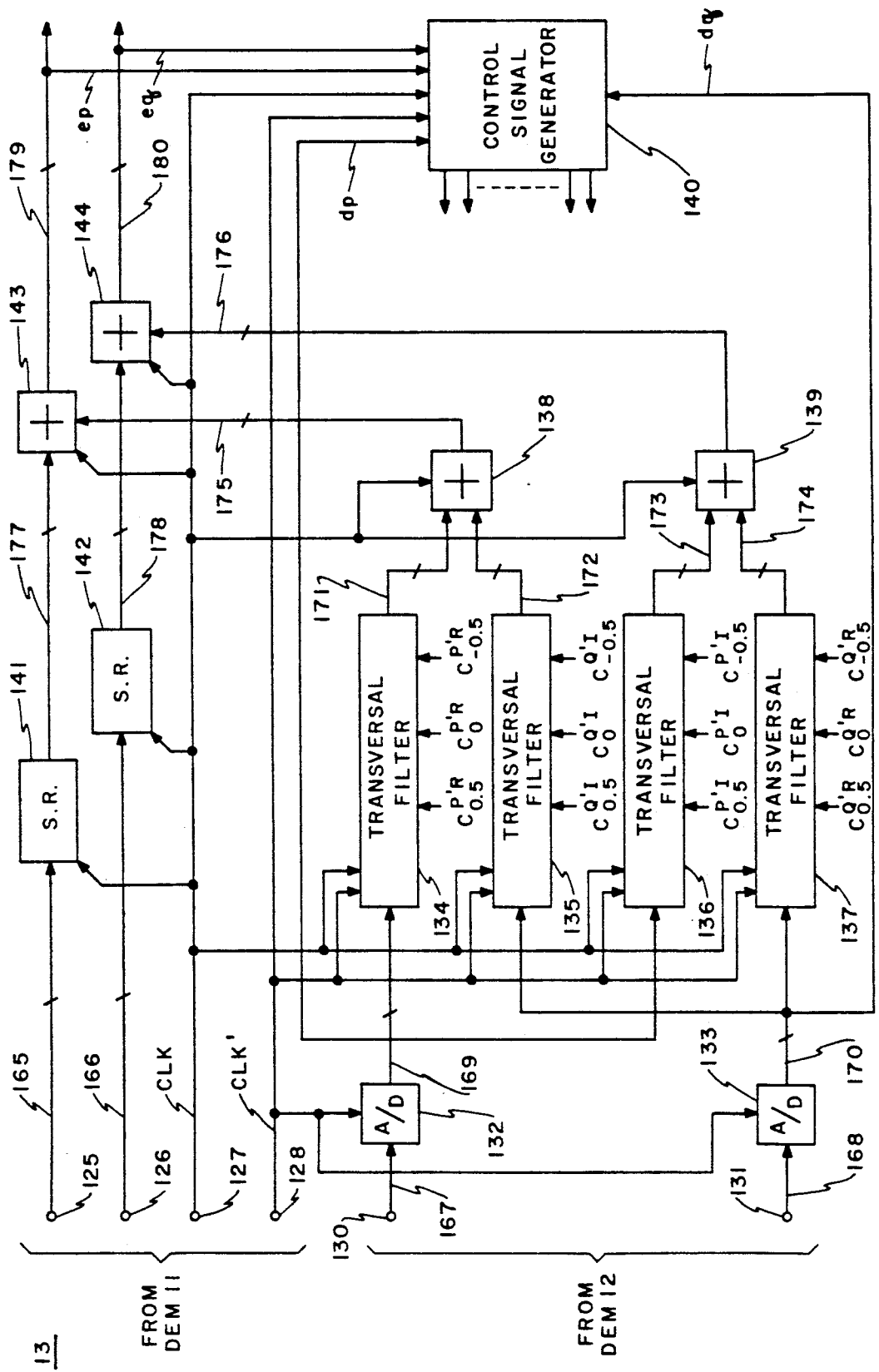
FIG. 9 is a structural block diagram illustrating a cross-polarization interference canceller which is a second preferred embodiment of this invention.

FIGS. 8 and 9 are structural block diagrams of the internal configurations of the demodulator and the cross-polarization interference canceller on the vertical polarized wave side for use with multi-level quadrature amplitude-modulated signals or multi-phase phase-modulated signals.

In FIG. 8, a detector 116 detects with a regenerated carrier from a carrier regenerating circuit 118 a modulated signal, resulting from the frequency-conversion of the receive signal on the vertical polarized wave side, and supplies an in-phase (Pch) analog baseband signal 163. Another detector 117 detects the modulated signal with another regenerated carrier resulting from the $\pi/2$ phase shifting of the regenerated carrier from the regenerating circuit 118 by a $\pi/2$ phase shifter 119, and supplies an orthogonally crossing (Qch) analog baseband signal 164. A clock regenerator 120 extracts clock components from the P-analog baseband signal 163 and the Q-analog baseband signal 164, and supplies a clock CLK having a frequency of f, which is equal to a symbol rate, and a period of $T_1 (=1/f)$. A/D converters 121 and 122 discriminatively regenerate the P-analog baseband signal 163 and the Q-analog baseband signal 164, respectively, with the clock CLK, and supplies an in-phase (Pch) demodulated signal (digital baseband signal) 165 and an orthogonally crossing (Qch) demodulated signal (digital baseband signal) 166. A frequency doubler 123 doubles the frequency of the clock CLK and supplies a clock CLK' having a period of T/2. The P-demodulated signal 165, the Q-demodulated signal 166, and the clocks CLK and CLK' are supplies to the cross-polarization interference cancellers on their own sides from respective output terminals 125, 126, 127 and 128. The P-analog baseband signal 163 and the Q-analog baseband signal 164 are supplied to the cross-polarization interference cancellers on the respectively opposite sides from corresponding output terminals 124 and 129.

A demodulator 12 on the horizontal polarized side has the same configuration.

In FIG. 9, A/D converters 132 and 133, respectively sample a P'-analog baseband signal 167 and a Q'-analog baseband signal 168, which have been subjected to quadrature detection after converting the frequencies of receive signals on the horizontal polarized wave side, with a clock CLK' to supply a P'-digital data signal 169 and a Q'-digital data signal 170. Transversal filters 134, 135, 136 and 137 have the same configuration as that of the transversal filter 115 in FIG. 6. The transversal filter 134 supplies a cancelling signal 171 for interference from P'ch of the other polarized wave with Pch of its own polarized wave in accordance with the P'-digital data signal 169 and control signals $C_{0.5}^{PR}$, $C_0^{PR}$ and $C_{-0.5}^{PR}$ from a control signal generator 140. The transversal filter 135 supplies a cancelling signal 172 for interference from Q'ch of the other polarized wave with P'ch of its own polarized wave in accordance with the Q'-digital data signal 170 and control signals $C_{0.5}^{QI}$, $C_0^{QI}$ and $C_{-0.5}^{QI}$ from the control signal generator 140. The transversal filter 136 supplies a cancelling signal 173 for interference from P'ch of the other polarized wave with Qch of its own polarized wave in accordance with the P'-digital data signal 169 and control signals $C_{0.5}^{PI}$, $C_0^{PI}$ and $C_{-0.5}^{PI}$ from the control signal generator 140. The transversal filter 137 supplies a cancelling signal 174 for interference from Q'ch of the other polarized wave with Qch of its own polarized wave in accordance with the Q'-digital data signal 170 and control signals $C_{0.5}^{QR}$, $C_0^{QR}$ and $C_{-0.5}^{QR}$ from the control signal generator 140. A digital adder 138, provided with a clock CLK, adds the interference cancelling signals 171 and 172, and supplies a cancelling signal 175 for interference from the other polarized wave with Pch of its own polarized wave. A digital adder 139, provided with the clock CLK, adds the interference cancelling signals 173 and 174, and supplies a cancelling signal 176 for interference from the other polarized wave with Qch of its own polarized wave. An SR 141, having a delay quantity of $\tau'$, which is the sum of the delay time $\tau$ in the formation of the main tap signals of the transversal filters and that of the digital adder 138, delays the P-demodulated signal 165 on the vertical polarized wave side by $\tau'$ at the clock CLK to supply a delayed signal 177. Similarly, an SR 142, having a delay quantity of $\tau'$, delays the Q-demodulated signal 166 on the vertical polarized wave side by $\tau'$ at the clock CLK to supply a delayed signal 178. A digital adder 143 adds the delayed signal 177 and the interference cancelling signal 175 at the clock CLK to supply a demodulated signal 179 of Pch cleared of the interference component. A digital adder 144 adds the delayed signal 178 and the interference cancelling signal 176 at the clock CLK to supply a demodulated signal 180 of Qch cleared of the interfering wave.

The control signal generator 140 generates by, for instance, the MZF method the control signals from the polarity bits $e_p$ and $e_q$ of error signals in the demodulated signals 179 and 180 of Pch and Qch, respectively, cleared of interference components; the polarity bits $d_p$ and $d_q$ of the demodulated signals 169 and 170 of the other polarized wave; and the clocks CLK and CLK', and supplies them to the transversal filters 134 through 137.

An XPIC 14 on the horizontal polarized wave side has the same configuration.

Although the foregoing description referred to the use of transversal filters having three taps, this invention does not limit itself to the use of three-tap transversal filters. Control signal generating means referred to therein uses the MZF method, but the generation of control signals is not limited to the MZF method, but can be achieved by the MSE method or any other applicable method. The buffer circuit can be provided only where required, as stated above.

As hitherto described, this invention makes it possible for digital multipliers and digital adders for generating interference cancellation to operate at low frequencies without any loss in the interference cancelling capability by sampling and delaying, with a frequency (2/T) of the symbole rate of one polarized wave, interfering signals from the other polarized wave and latching the sampled and delayed signals in periods of T. Therefore, no expensive elements are needed for the digital multipliers and the digital adders, and power consumption can also be saved when these circuits are large-scale integrated because they are operable at low frequencies. The transmission rate can also be increased since no parallel system is needed to cope with a high input clock frequency.

What is claimed is:

1. A cross-polarization interference canceller for use in a digital radio communication system which transmits digital modulated signals over radio frequencies having planes of polarization orthogonal to each other and into which analog baseband signals resulting from the detection of digital modulated signals of a first polarized wave and demodulated signals discriminatively regenerated by detecting digital modulated signals of a second polarized wave are entered to supply demodulated signals of the second polarized wave cleared of the component of interference by the first polarized wave with the second polarized wave, comprising:

analog-to-digital (A/D) converting means for sampling said analog baseband signals with a first sampling frequency equal to double the frequency of the modulation rate of the second polarized wave and supplying digital data signals;

an N-tap shift register for delaying said digital data signals, each by a period corresponding to the reciprocal of said first sampling frequency, and supplying first through Nth (N≧2) delayed digital data signals;

latching means for latching said digital data signals and said first through Nth delayed digital data signals, each by a period corresponding to the reciprocal of the modulation rate of said second polarized wave, and supplying first through (N+1)th latched digital data signals;

tap coefficient generating means responsive to said digital data signals of said first polarized wave and said demodulated signals of said second polarized wave cleared of the component of interference by the first polarized wave, for generating first through (N+1)th control signals;

first through (N+1)th multiplying means, supplied with a second sampling frequency equal to the frequency of the modulation rate of said second polarized wave, for multiplying the matching pairs of said first through (N+1)th latched digital data signals and said first through (N+1)th control signals and supplying first through (N+1)th multiplication product signals;

first adding means, supplied with said second sampling frequency, for adding said first through (N+1)th multiplication product signals and supplying an interference cancelling signals;

first delaying means for delaying said demodulated signals by a predetermined lag and supplying delayed demodulated signals; and second adding means, supplied with said second sampling frequency, for adding said delayed demodulated signals and said interference cancelling signal, and supplying said demodulated signals cleared of said component of interference.

2. A cross-polarization interference canceller, as claimed in claim 1, having;

buffer means for retiming said first digital data signals and supplying the retimed digital data signals, in place of said first digital data signals, to the input stage of said N-tap shift register.

3. A cross-polarization interference canceller, as claimed in claim 1, wherein said tap coefficient generating means comprises:

second delaying means for delaying a first polarity signal, which is the most significant bit (MSB) of said digital data signals, by a predetermined lag and supplying the delayed first polarity signal;

first through Nth flip-flops for delaying said delayed first polarity signal by a period equal to the reciprocal of said first sampling frequency and supplying first through Nth delayed versions of the first polarity signal;

exclusive OR means for determining the correlations among a second polarity signal, which is the MSB of error signals in said demodulated signals cleared of said component of interference, said delayed first polarity signal and said first through Nth delayed versions of the first polarity signal, and supplying first through (N+1)th correlation signals; and first through (N+1)th integrating means responsive to said second sampling frequency for integrating said first through (N+1)th correlation signals, respectively, and for supplying said control signals.

4. A cross-polarization interference canceller for use in a digital radio communication system which transmits multi-level quadrature amplitude-modulated signals or multi-phase phase-modulated signals over radio frequencies having planes of polarization orthogonal to each other and into which first and second analog baseband signals resulting from the quadrature detection of the digital modulated signals of a first polarized wave and first and second demodulated signals discriminatively regenerated by quadrature detection of the digital modulated signals of a second polarized wave are entered to supply first and second demodulated signals of the second polarized wave cleared of the component of interference by the first polarized wave with the second polarized wave, comprising:

first and second A/D converting means for sampling said first and second analog baseband signals with a first sampling frequency equal to double the frequency of the modulation rate of the second polarized wave and supplying first and second digital data signals;

first and second transversal filter means, into which said first analog baseband signals are entered, for supplying first and second signals for cancelling the interference from said first analog baseband signals with said first and second demodulated signals;

third and fourth transversal filter means, into which said second analog baseband signals are entered, for supplying third and fourth signals for cancelling the interference from said second analog baseband signals with said first and second demodulated signals;

first adding means, supplied with a second sampling frequency which is equal to the frequency of the demodulation rate of the second polarized wave, for adding said first and third interference cancelling signals to supply a fifth interference cancelling signals;

second adding means, supplied with said second sampling frequency, for adding said second and fourth interference cancelling signals to supply a sixth interference cancelling signal;

first and second delaying means for delaying said first and second demodulated signals by a predetermined lag and supplying first and second delayed demodulated signals; and third and fourth adding means, supplied with said second sampling frequency, for adding said delayed first and second demodulated signals and said fifth and sixth interference cancelling signals to supply first and second demodulated signals of the second polarized wave cleared of said component of interference, wherein each of said first through fourth transversal filter means has:

an N-tap shift register for delaying input signals, each by a period corresponding to the reciprocal of said first sampling frequency, and supplying first through Nth (N≧2) delayed digital data signals;

latching means for latching said input signals and said first through Nth delayed digital data signals, each by a period corresponding to the reciprocal of said second sampling frequency, and supplying first through (N+1)th latched input signals;

tap coefficient generating means responsive to said digital data signals of said first polarized wave and said demodulated signals cleared of said component of interference of said second polarized wave for generating first through (N+1)th control signals;

first through (N+1)th multiplying means, supplied with said second sampling frequency, for multiplying the matching pairs of said first through (N+1)th latched input signals and said first through (N+1)th control signals and supplying first through (N+1)th multiplication product signals; and fifth adding means, supplied with said second sampling frequency, for adding said first through (N+1)th multiplication product signals and supplying an output signal.

5. A cross-polarization interference canceller, as claimed in claim 4, wherein each of said first through fourth transversal filter means comprises:

buffer means for retiming said input signals and supplying the retimed input signals, in place of said input signals, to the input stage of said N-tap shift register.

* * * * *